United States Patent

[11] 3,560,676

| [72] | Inventor | Mario Battaglia<br>Milan, Italy |
|---|---|---|
| [21] | Appl. No. | 810,741 |
| [22] | Filed | Mar. 26, 1969 |
| [45] | Patented | Feb. 2, 1971 |
| [73] | Assignee | General Electric Company<br>New York, N.Y.<br>a corporation of New York |
| [32] | Priority | Apr. 8, 1968 |
| [33] | | Italy |
| [31] | | 14,953/68 |

[54] EXTRACTING DEVICE FOR APPARATUSES
5 Claims, 7 Drawing Figs.

[52] U.S. Cl. .................................................... 200/50
[51] Int. Cl. ..................................................... H01h 9/24
[50] Field of Search ........................................... 200/50.15; 317/103

[56] References Cited
UNITED STATES PATENTS

| 3,005,064 | 10/1961 | Baird et al. ................. | 200/50.15 |
| 3,170,051 | 2/1965 | Fehling et al. ............... | 200/50.15 |
| 3,188,414 | 6/1965 | Boyden ........................ | 200/50.15 |

*Primary Examiner*—Robert K. Schaefer
*Assistant Examiner*—M. Ginsburg
*Attorneys*—Robert T. Casey, Robert S. Smith, David M. Schiller, Frank L. Neuhauser and Oscar B. Waddell

ABSTRACT: A drawout type circuit breaker assembly in which a spring-biased trip member is normally held in an inactive position, but which is released to cause tripping of the circuit breaker whenever a removable handle for the drawout mechanism is mounted in place to assure that the breaker will be in open condition whenever the drawout mechanism is actuated.

In another aspect, the drawout mechanism includes two slidable rods supporting the circuit breaker, and two pairs of toggle links operating the rods.

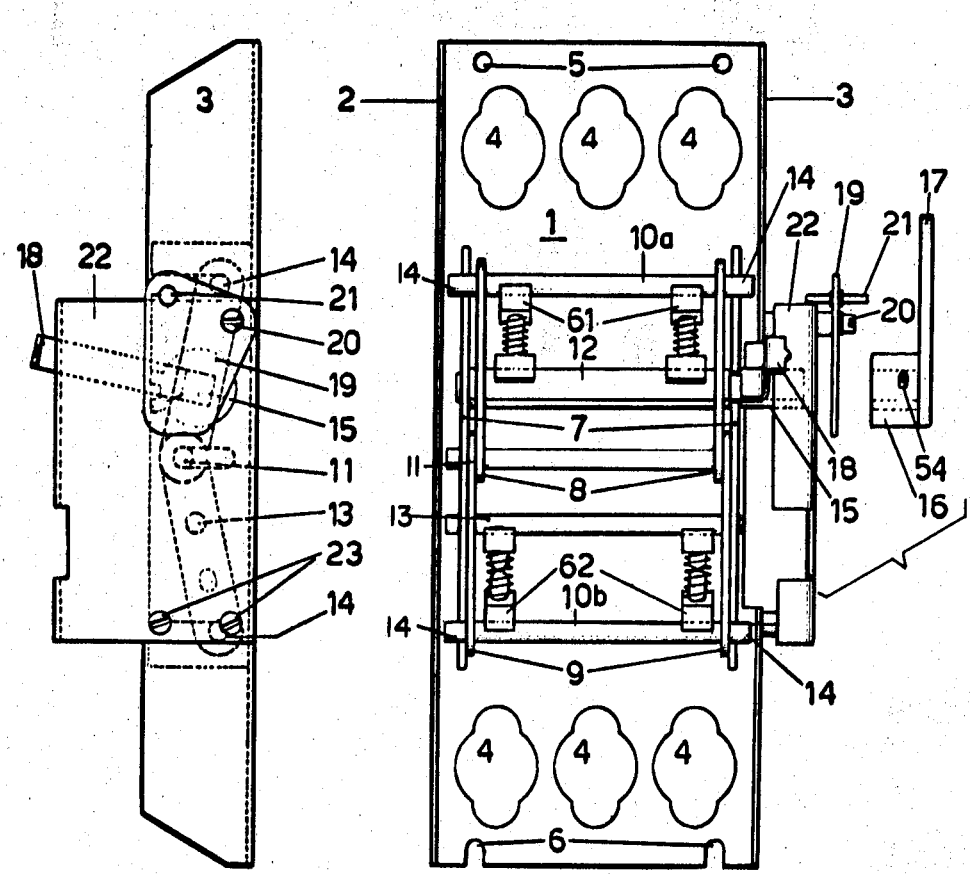
FIG. IA  FIG. IB

INVENTOR
MARIO BATTAGLIA
BY Robert D. Casey
ATTORNEY

3,560,676

EXTRACTING DEVICE FOR APPARATUSES

BACKGROUND OF THE INVENTION

The present invention covers a device that can be applied to electric circuit breakers of the drawout type. Due to its characteristics, the device is particularly, although not exclusively, suitable for use with molded case circuit breakers.

Drawout circuit breakers are well known in technology and are characterized by the fact that they are equipped with plug-in connections of various types (pliers-type, tulip-type, etc...). Parts of these connections are carried by the circuit breaker and are electrically connected at the input and output of each pole. The cooperating parts of the connections are fastened to a stationary support, such as a frame or an electrical switchboard, and are connected to the corresponding phases of the incoming power line and of the line leading to the load.

In the simplest form, the circuit breaker is moved in and out manually, and the plug-in connections perform duty also as a support. In the more complex forms, the circuit breaker is supported by a frame which slides on guides.

Safety requirements call for locking devices to prevent the insertion or drawing-out of the circuit breaker while it is in closed condition in order to prevent the plug-in connections from being used to interrupt current, which they are not intended to do. In addition, closing of the circuit breaker must be possible only when the plug-in connections are fully mated in order to guarantee their ability to carry the currents involved. Said locking devices generally use a release device, with which circuit breakers are normally equipped for other requirements, which is able to assume two positions: a release position in which opening of the circuit breaker if it is closed, is brought about (i.e., the breaker is "tripped") and its closing is prevented; and a second position, in which the circuit breaker can be regularly operated.

In drawout circuit breakers with a molded case, the locking device will often comprise a rod, called a release or "trip" rod. This rod is normally kept in the release position by a spring and, while in this position, one of its ends protrudes from the rear face of the circuit breaker on which parts of the plug-in connections are also installed. The second position occurs when the end of the said rod is pushed toward the rear face of the circuit breaker against the action of the spring; this occurs when the circuit breaker is fully inserted, and is generally brought about by means of a strike device provided on the stationary support and acting on the said rod.

However, the latter arrangement is not completely satisfactory. In fact, it provides that, during the switching off operation, the said rod, disengaging from the strike device, moves toward the release position in order to bring about the opening of the circuit breaker; due to a possible faulty adjustment, or if the switching off operation is made too quickly, however, it may happen that the plug-in connections will open the circuit prior to tripping of the circuit breaker. There is the frequent requirement for the possibility of making a "dry-run" test, during which the circuit breaker, disconnected from the main system, can be actuated in order to make a dry-run test of the closing and opening operations and also to check the correct operation of auxiliary accessories such as opening release devices, signaling or locking contacts, etc.

SUMMARY OF THE INVENTION

The subject of the present invention is a device which allows the support, the moving in and out, the dry-run test and the removal of a drawout circuit breaker; a compact device with the smallest overall dimensions easy to operate particularly from the standpoint of the effort required of the operator for moving in and out.

An additional aim of the present invention is that the device be implemented in such a way that the inserted and withdrawn positions be well defined and locked in order to avoid uncertain positions and undesired operations.

A further aim of this invention is that the said device allow insertion and withdrawal only when the circuit breaker is in the fully open position and the closing of the circuit breaker only when it is in the fully inserted position; finally, when a withdrawing operation is started with the circuit breaker in the inserted position, the device must bring about the opening with a positive action relative to the disconnecting of the plug-in connections.

The device, which is the subject of the present invention, is applicable to a drawout circuit breaker equipped with a release device of the above-mentioned type and such as to normally find itself in the release position in which the circuit breaker can be closed or remain closed only if the said device is pushed and maintained in aforesaid second position (i.e., pushed in). The drawout mechanism consists essentially of a first section applied to the circuit breaker and a second stationary section applied to the supporting frame.

The said first section comprises hook-type arms and an interlock lever which can be actuated by the operator to move the release device to the release position.

The stationary section comprises a support plate provided with holes or other means for fastening to the support. This plate is fastened in a well-defined position relative to the stationary parts of the plug-in contacts, or, even better, it is designed to carry also the stationary plug-in connections installed in the correct position. On the support plate are hinged two lever assemblies, each of which consists of two similar, parallel and spaced levers rigidly connected with respect to each other. The rotational axes of the two lever assemblies are transverse to the plate and parallel to each other as well as to the base of the plate. At the ends of such levers, on the opposite side to the rotational axes, there are rungs, or other similar devices, from which the circuit breaker is hung by means of the above-mentioned hook-type arms. An actuating lever can be mounted on the pin of one of the two lever assemblies in order to bring about a rotation limited between two stops. The two lever assemblies are connected to each other, for instance by means of pins and elongated holes provided in the said levers, in order that the rotation of one of them will bring about a corresponding rotation of the other, although in the opposite direction. Such rotations cause the rungs to move, thus moving the circuit breaker and bringing it near the base of the support plate or moving it away from it. In other words, the circuit breaker can be moved in and out by means of the said actuating lever.

A tripping lever, hinged on a pin integral with the plate, can assume two different positions, namely a first tripping position, toward which it is pushed by a spring, and a second non-tripping position in which it permits switching on and off operations/of the circuit breaker.

The said first position can be reached only when a rung or similar protruding device, located at an end of the locking lever can fully engage itself in corresponding holes or in other strike devices which are provided on the lever assemblies. This occurs only when the lever assemblies are in the positions corresponding to a fully inserted position of the circuit breaker or a completely withdrawn position of the circuit breaker. A kind of lock is thus realized which prevents all movements of the circuit breaker from the extreme positions when the locking lever is in the above-mentioned first position.

Mounted on the support plate there is also a hooking tooth which may assume two positions and which is maintained in a first "normal" position by a spring. In this normal position the tooth hooks the lever, after it has been pushed by the operator and when the circuit breaker is in the inserted position. The tripping device is thus kept in the inactive position and it is therefore possible to perform the closing and opening operations of the circuit breaker.

When the drawout actuating lever is engaged, it will act on the mentioned locking lever by moving it to its second position; the locking lever will thus release the mentioned lock and will also move the hooking tooth to a second position in which it can no longer engage the lever. In such a situation it is then possible to perform the insertion and withdrawal operations while the tripping device prevents the closing operation of the circuit breaker and brings about its opening in the event that it should be closed.

From the above it is obviously seen that, in order to be able to close the circuit breaker after having moved it to its inserted position, it is necessary to remove the actuating lever in order to allow the locking lever to resume its first position (with the lock restored and the hooking tooth in normal position) and it is necessary to push the tripping lever until it is engaged by the appropriate tooth so as to restore the tripping device to the inactive position.

A dry-run test can be performed only if the operator, after checking that the circuit breaker is off, keeps intentionally the tripping lever in the nontripping position.

It will be possible to better understand the invention from the following implementation example which illustrates a drawout device applied to an automatic molded case circuit breaker of the drawout type and equipped with a release rod.

DESCRIPTION OF THE DRAWINGS

FIG. 1A is a side elevation view the stationary or frame portion of a device constructed in accordance with the invention;

FIG. 1B is a front elevation view of the device of FIG. 1A;

Figures 2A, 2B, 2C:
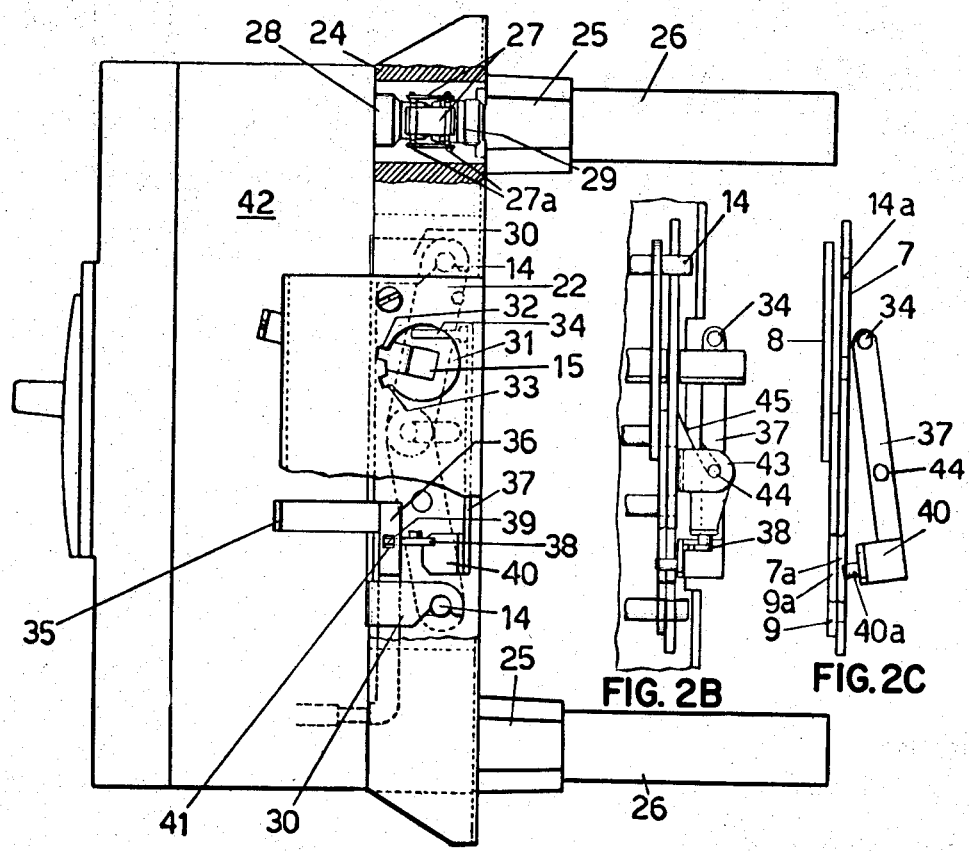
FIG. 2A is a side elevation view partially in section of a complete drawout mechanism in accordance with the invention, and showing a molded case circuit breaker in place.
FIGS. 2B and 2C are views of details of the mechanism of FIG. 2A.

The stationary section of the device subject of the invention, as shown in FIG. 1, consists of a sturdy metal plate 1 equipped with two bent edges 2 and 3. Three holes 4, are provided in the upper section of the plate 1 and another three holes 4 are provided in the lower section, for the passage of the stationary portions of the plug-in connections, to be described, supported by the plate. Holes 5 and eyelets 6 in the plate, are used to fasten plate 1 to the support panel (not shown). Also fastened to the said plate 1 is a frame 7 which has the duty of carrying the lever assemblies consisting of a first pair of levers 8 integral with the revolving shaft 12 and of a second pair of levers 9 rotating around shaft 13. The two pairs of levers are connected to the two end of pins 10a and 10b and 11. Pins 10a and 10b have protruding ends 14 which serve to engage the moving section of the device to the described. The revolving shaft 12 protrudes with a square section 15 on which engages hub 16 which is part of the actuating lever 17. Integrally anchored to shaft 15 there is a rod-pointer 18 which has the duty of indicating whether the circuit breaker is in the inserted or withdrawn position.

A small plate 19 hinged around screw 20 and equipped with a stop rung 21 prevents the actuating lever 17 from moving away from part 15 of shaft 12 during the operations.

A second plate 22 (see FIG. 1A) fastened to edge 3 of plate 1 by means of screws 20 and 23 equipped with spacers, serves to support the locking and release devices to be described.

The details of the plug-in connections and of the locking and release devices are illustrated in FIGS. 2A, 2B, and 2C.

The conductors which connect the circuit breaker to the external line are formed by bars 26 supported and inserted in a piece of plastic material 24 which ends with projections 25. The bars 26 are welded to tulip-type joints consisting of a massive and cylindrical metal body 29 equipped with bevels and grooves, to an end of which is welded bar 26 while around the other end is arranged a socket formed by segments 27 kept joined by springs 27a. Inside the above-mentioned socket is inserted a metal body 28, which is cylindrical and is provided with several bevels. The said metal body 28 is fastened to a pole of circuit breaker 42.

Figure 3:
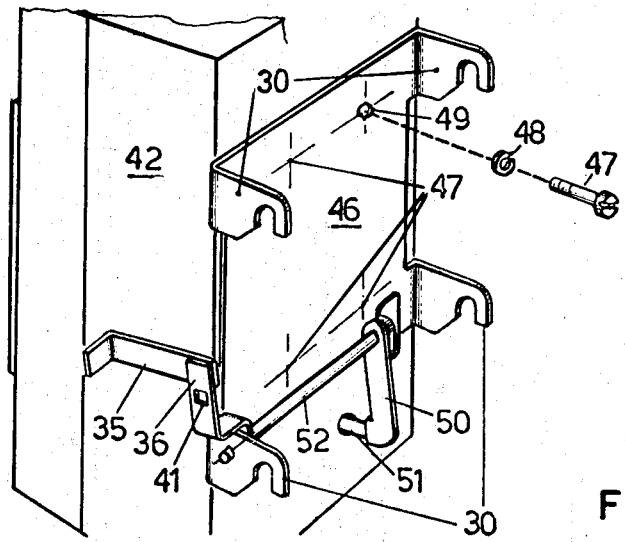
FIG. 3 is a perspective view, from the rear, of the circuit breaker portion of the device of FIG. 2A, partially broken away.

The said circuit breaker 42 is fastened to the ends 14 of pins 10a 10b by sturdy hooks 30 integral with its bottom, see FIG. 1B and FIG. 3.

The lateral plate 22 has a circular hole 31 having two notches 32 and 33 which allow the introduction and extraction of the actuating lever 17 only when it is in the extreme position corresponding to fully inserted or fully withdrawn conditions, namely when tooth 54 illustrated in FIG. 1 coincides with one of the said slots.

Lever 37, called locking lever, which is more clearly visible in FIGS. 2B and 2C is pivoted on fulcrum 44 of bracket 43 and is equipped at one end with rung 34, against which leans hub 16 of lever 17 of FIG. 1. At the other end the lever 37 is equipped with a square portion 40 which carries another rung 40a which, when lever 17 is removed, becomes engaged in holes 7a and 9a provided respectively in frame 7 and lever 9, forming a kind of lock which prevents the actuation of the lever assemblies.

In fact, when lever 17 is removed and the circuit breaker is in the on position, lever 37, on account of spring 45, finds itself in the position shown in FIG. 2B.

When lever 17 is inserted, on the other hand, lever 37 is moved to the position shown in FIG. 2C. In this latter case rung 40a clears hole 9a allowing the movement of the lever assemblies.

An analogous locking occurs when the circuit breaker is in the off position, except that rung 40a, rather then becoming engaged in hole 9a, exerts its locking action by acting under the edge of lever 9.

Lever 35—36, called a tripping lever, has a hole 41 inside which receives the tip 39 of a lever 38 actuated by the portion 40, integral with the locking lever 37.

The section of the drawout mechanism coupled to the circuit breaker is shown in FIG. 3. This section consists of a metal plate 46 fastened on the back of the circuit breaker by means of screws 47 (only one shown) which fit into holes 49 with the interposition of split washers 48. Plate 46 is equipped with four hooks 30, which provide for the engagement of the circuit breaker on ends 14 of pins 10a and 10b.

The tripping lever 35—36 with its hole 41 is integral with shaft 52 which, in turn, is integral with a second lever 50 acting on rod 51, called a trip rod.

Trip rod 51 brings about the opening of the circuit breaker when lever 50 does not push on it, namely every time that the tripping lever 35—36 is released. It is possible to perform the so-called dry-run test by pressing lever 35 when the circuit breaker is disconnected.

Figure 4:
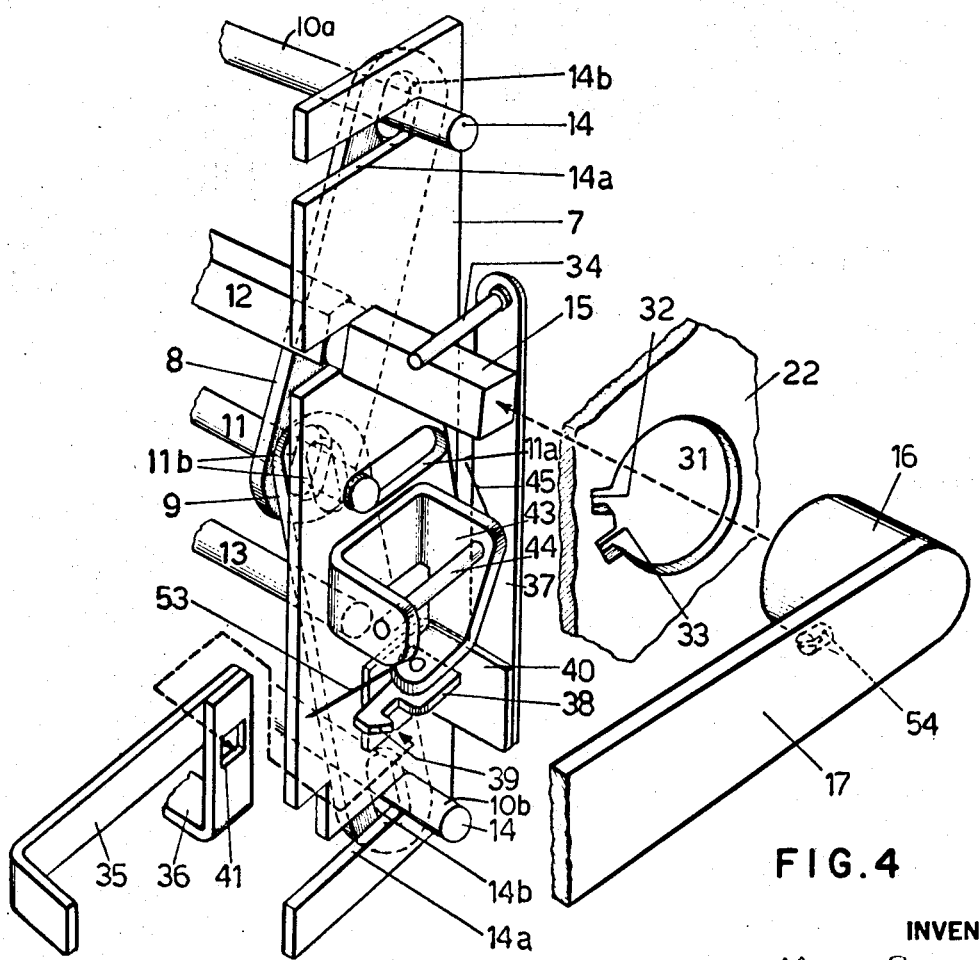
FIG. 4 is a perspective view, partially exploded, of parts of the mechanism of the device of FIG. 2A.

The operation of the lever assemblies of the locking and go-ahead mechanism can be understood from FIG. 4. Lever 8, integral with revolving shaft 12, moves pin 10a, with end 14, and pin 11 along the straight guides 14a and 11a provided in frame 7, such movement being permitted by oval holes 14b and 11b. Lever 9, driven by a pin 11 which becomes engaged in its oval hole 11b, is forced to revolve around shaft 13, driving with oval hole 14 b the corresponding pin 10b, with end 14, along the straight guide 14a.

The compression spring assemblies 61 and 62, shown in FIG. 1B, reacting with shafts 12 and 13, push the ends 14 of pins 10a and 10b against guides 14a so as to favor the reaching of the fully inserted or fully withdrawn positions of the circuit breaker. In fact, these positions, springs 61 and 62 are in the condition of minimum compression. The protruding end 15 of shaft 12 receives hub 16 of the actuating lever 17 which can be introduced only in the two positions in which tooth 54 coincides with one of the slots 32 and 33 of the circular hole 31 provided in plate 22.

Hub 16, when it is slipped into end 15 of shaft 12, pushes rung 34 fastened to an end of lever 37 which, revolving around fulcrum 44, moves square portion 40 of lever 37 bringing about both the release of lever 9 and the rotation of device 38, whose tooth 39 comes out of hole 41 provided in the tripping lever 35—36 which, being released, brings about the release of the circuit breaker by means of the trip rod 51 described in connection with FIG. 3.

This means that the introduction of the actuating lever 17 immediately causes the release or tripping of the circuit breaker. Lever 37 is maintained in its normal position by spring 45 which leans on it at one end and leans on the other end on frame 7. Also device 38, which is also a lever, is maintained in normal position by a spring 53 leaning on frame 7 and on device 38. Bracket 43 bears pins around which rotate levers 37 and 38.

Figure 5A:
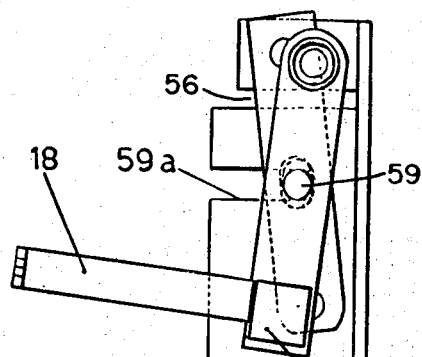
FIG. 5A is a side elevation view.
Figure 5B:
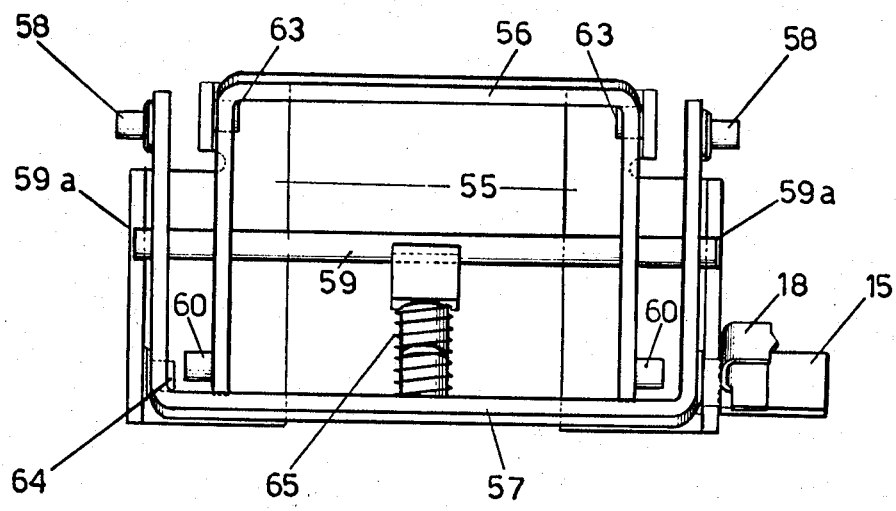
FIG. 5B is a front elevation view of the stationary section of a second embodiment of the invention which provides for a simplified system of lever assemblies.

A simplified system of lever assemblies is shown in FIG. 5A and 5B. This system comprises two U-shaped devices 56 and 57 which act as double levers. Device 56 is hinged on the two pins 63; device 57 is hinged on pin 64 and on the rounded section of shaft 15. The above-mentioned two U-shaped devices are coupled by means of elongated holes to a pin 59 which is forced to slide along straight guides 59a provided in supports 55. This coupling is responsible for the fact that the rotation of device 57 brings about a corresponding rotation in opposite direction of device 56.

The square shaft 15, located on the revolving axis of device 57, has the same duty as corresponding shaft 15 shown in the preceding FIGS. and bears a similar pointer-rod 18.

Two rungs 58, at the ends of device 56, serve to engage hooks 30 present on the section coupled to the circuit breaker and similar to the one shown in FIG. 3.

A spring 65 between the transverse portion of device 57 and pin 59 pushes the said pin against the guides 59a in such a way as to favor reaching the extreme positions corresponding to fully inserted or fully withdrawn; in these positions, in fact, spring 65 finds itself in conditions of minimum compression.

Referring to the complete device, it is therefore obvious that the closing and opening operation of the circuit breaker is possible only when it is fully inserted and the actuating lever 17 is extracted, so that the locking lever 37 assumes the position shown in FIG. 2B. In these conditions, by pressing against the tripping lever 35—36, it is engaged by tooth 39 and neutralizes the release device.

Whenever one wishes to move the circuit breaker to the drawnout position, it is first necessary to insert the actuating lever 17 and this, by moving lever 37 to the position shown in FIG. 2C, brings about the disengagement of tooth 39 from the tripping lever 35—36 which, becoming disengaged, allows the entry into action of the release device which opens the circuit breaker. Therefore, the sole introduction of the actuating lever immediately leads to the opening of the circuit breaker so as to render impossible the wrong maneuver of drawing-out of the circuit breaker in the event that its contacts should be closed.

The tripping lever 35—36 makes it possible to make a dry-run test of the circuit breaker in the disconnected or withdrawn position, In fact, when the circuit breaker is disconnected it is possible to test its devices by turning it on and off provided that the said lever 35—36 is kept pressed.

The device subject of the present invention has been primarily described as applicable to electrical circuit breakers, however, obviously it may be used in the inserting and drawing-out operations for extractable electrical apparatuses in general. Therefore, the following claims are intended to cover also such different applications, comprising those where the device is a plain switching on and off switching device, rather than a molded case circuit breaker and any other modifications as fall with the time spirit and scope of the invention.

I claim:

1. A drawout type electric circuit breaker assembly comprising:
   a. a stationary support member having a plurality of first plug-in-type electric contacts;
   b. a movable support member;
   c. an electric circuit breaker having a plurality of second plug-in-type contacts for coaction with said first plug-in contacts;
   d. means supporting said electric circuit breaker on said movable support member;
   e. operating mechanism for moving said movable support member and said circuit breaker between a first position in which said plug-in contacts of said circuit breaker are in contact with said plug-in contacts of said stationary support member and a second position in which said plug-in contacts of said circuit breaker are out of contact with said plug-in contacts of said support member;
   f. said operating mechanism including an operating handle;
   g. means removably connecting said operating handle to said operating mechanism;
   h. said circuit breaker including a generally rectangular insulating casing and a tripping member accessible through a wall of said insulating casing for causing tripping of said circuit breaker;
   i. means actuated upon connecting of said operating handle to said operating mechanism for initiating tripping movement of said tripping member, whereby said circuit breaker is automatically tripped to open circuit position whenever said operating handle is connected to said operating mechanism, thereby assuring that said circuit breaker will be in off condition whenever said operating mechanism is operated to move said plug-in contacts of said circuit breaker in to or out of engagement with said plug-in contacts of said stationary support member.

2. A drawout type circuit breaker assembly as set forth in claim 1 wherein said circuit breaker has a backwall positioned adjacent and substantially parallel to said stationary support member when said circuit breaker is in said second position, and wherein said circuit breaker tripping member comprises a member accessible through an opening in said backwall of said circuit breaker insulating casing.

3. A drawout type circuit breaker assembly as set forth in claim 1 where said means initiating tripping movement of said tripping member upon connecting of said operating handle to said operating mechanism comprises a lever normally engaging and holding said tripping member in inactive position, a restraining catch normally engaging and holding said lever, and means engaged by said operating handle for engaging said restraining catch and moving said catch out of engagement with said lever to permit tripping movement of said tripping member.

4. A drawout-type circuit breaker assembly comprising:
   a. a stationary support member;
   b. a movable support member;
   c. means for mounting an electric circuit breaker on said movable support member;
   d. means for moving said movable support member toward and away from said stationary support member;
   e. said means for moving said movable support member toward and away from said stationary support comprising two pairs of toggle members, each of said toggle members being pivotally supported intermediate the ends thereof on said stationary support member and each of said pair of toggle members comprising an upper toggle link and a lower toggle link;
   f. said upper and lower toggle links of each pair having adjacent ends interconnected by lost-motion interconnecting means;
   g. a first support rod extending transversely of said stationary support member;
   h. means for guiding said first support rod for substantially rectilinear movement toward and away from said support member in a direction perpendicular to the length of said rod;
   i. a second support rod extending transversely of said stationary support member;
   j. means supporting said second support rod for substantially rectilinear movement toward and away from said stationary support member in a direction generally perpendicular to the length of said rod;
   k. means connecting said first support rod to the ends of said upper toggle links remote from said interconnected ends;

l. means connecting said second support rod to the ends of said lower toggle links remote from said interconnected ends; and m. a manually operable handle member rigidly connected to at least one of said toggle links for rotating said toggle link about its pivotal support on said stationary support member.

5. A drawout circuit breaker assembly as set forth in claim 4, wherein said circuit breaker assembly includes overcenter spring means tending to hold said movable support member in each of its extreme positions with respect to said stationary support member.